United States Patent [19]

Gautier

[11] Patent Number: 5,074,024

[45] Date of Patent: Dec. 24, 1991

[54] PROCESS FOR ASSEMBLING A SERVOMOTOR

[75] Inventor: Jean-Pierre Gautier, Aulnay S/Bois, France

[73] Assignee: Bendix France, Drancy, France

[21] Appl. No.: 223,828

[22] Filed: Jul. 14, 1988

[30] Foreign Application Priority Data

Jul. 21, 1987 [FR] France ............................... 87 10277

[51] Int. Cl.$^5$ ............................................. B23P 19/04
[52] U.S. Cl. ........................................ 29/451; 29/513
[58] Field of Search ................. 29/510, 511, 513, 432, 29/437, 450, 451

[56] References Cited

U.S. PATENT DOCUMENTS

| | | | |
|---|---|---|---|
| 3,158,930 | 12/1964 | Wesstrom et al. | 29/510 |
| 4,136,438 | 1/1979 | Mallors | 29/510 X |
| 4,268,945 | 5/1981 | Van Arman et al. | 29/156.4 R X |
| 4,366,612 | 1/1983 | Dorsett et al. | 29/510 X |

*Primary Examiner*—Timothy V. Eley
*Assistant Examiner*—Peter Dungba Vo
*Attorney, Agent, or Firm*—Larry J. Palguta; Ken C. Decker

[57] ABSTRACT

The invention relates to a process for the assembly, by crimping, of a cover (10) to a cylinder (12), in which the cylinder (12) has a rim (18) extending outwardly and the cover (10) has a border of which radial shoulder (14) is substantially parallel to the rim (18) and a cylindrical projection (16), in which a plurality of uniformly distributed oblong slots (22) has been made, is perpendicular to the rim which it surrounds. The cylinder (12) is fitted into the cover (10) after a deformable gasket (19) has been arranged between them and other components of the finished assembly have been enclosed, the cover (10) and cylinder (12) having previously been covered with a protective coating. According to the invention, the process involves the steps of the cover (10) and cylinder (12) being pressed against one another so as to crush the gasket (19), with zones of less resistance (24) being located between boundaries (25) of the slots (22) and a free edge of the cover (10) being stamped in such a way that the middle parts of the stamped boundaries (25) move away from a plane (Y) parallel to the rim (18) and passing through the ends of the slots (22), and pressure tending to crush the gasket (19) being released. The invention is used for the manufacture of brake boosters for vehicles.

5 Claims, 1 Drawing Sheet

PROCESS FOR ASSEMBLING A SERVOMOTOR

The present invention relates to a process for the assembly, by crimping, of two pieces in the general form of a cup, and which can be used particularly for assembling the cylinder and cover of a servomotor of the vacuum type, such as is used for boosting the braking of motor vehicles.

Servomotors of the vacuum type which can be used particularly for boosting the braking of motor vehicles are known. Such a servomotor is described in U.S. Pat. No. 4,571,942. It comprises a cover and a cylinder made of sheet metal and crimped on their periphery. It is known to carry out the crimping as a result of shearing and the simultaneous deformation of zones uniformly distributed angularly over the periphery of the cover. This process has several disadvantages, particularly with regard to the crimping force. Because of the simultaneous operation of shearing and deforming the sheet metal, it is necessary to use, with considerable force, a punch which has a special profile, with risks of rejection if there is imperfect positioning of the tool or wear of the latter. Furthermore, very often there is peeling of the protective coating of the sheet metal in the region of the deformed zone, and a sheared part is not protected.

To overcome this disadvantage, it is known from U.S. Pat. No. 4,331,201, prior to the crimping, to make oblong slots in one of the pieces in order to define zones of less resistance which can be deformed simply by being pressed down in order to corrugate the outer edge. The punch to be used then no longer works by shearing, thus substantially reducing the risks of rejection because of imperfect positioning or peeling of the protective coating of the sheet metal in the region of the deformed zone. Moreover, the protective coating deposited after the operation of cutting out the oblong slots protects the edge of the non-deformed boundary of the slot against corrosion.

However, during deformation and subsequently, when there are relative micro-movements between the deformed boundary and the rim bearing on the boundary, the protective coating deposited on the edge of the deformed boundary and also the coating on the rim opposite the deformed boundary tend to become worn and to peel off, thus defining corrosion sources unacceptable particularly in vacuum servomotors for brake boosting which equip motor vehicles.

An object of the present invention is, therefore, to overcome this disadvantage.

The invention relates, in general terms, to a process for the assembly, by crimping, of a metal cylinder and a metal cover, of which the first has a rim extending outwardly and the second has a border, of which a radial shoulder part is substantially parallel to the rim and a cylindrical projection, in which a plurality of uniformly distributed oblong slots has been made, has a longitudinal axis parallel to the rim and a boundary near a free edge of the cylindrical projection is perpendicular to the rim which the boundary opposes, the cylinder being fitted into the cover after a deformable gasket has been arranged therebetween and other components of the assembly have been enclosed, the cylinder and the cover having previously been covered with a protective coating.

According to the invention, the process also involves the following steps:

the cylinder and the cover are pressed against one another so as to crush the gasket;

zones of less resistance located between said boundary and a free edge of each zone are stamped in such a way that a middle part of the stamped boundary moves away from the plane parallel to the rim and passing through ends of the slot; and the pressure tending to crush the gasket is released.

Preferably, the stamping step is carried out by means of a punch, the working surface of which has an axis perpendicular to the axis of the slots and not parallel to the zone to be stamped, the pressure being exerted on the punch perpendicularly to the zone to be stamped. Alternatively, it is carried out by means of a punch, the working surface of which has an axis perpendicular to the axis of the slots and to the axis in which the required pressure is exerted, the latter having an acute angle relative to the perpendicular to the zone to be stamped.

In order to assist the check of the quality of assemblies obtained in this way, it is preferable that the width of the slots is such that it allows a visual check of the positioning of the gasket.

Of course, the slots preferably assume either an oval form or a substantially rectangular form.

The invention also relates to a vacuum servomotor intended for boosting the braking of a vehicle and assembled according to the process.

The present invention will now be described by way of example with reference to the accompanying drawing in which.

Figure 1:
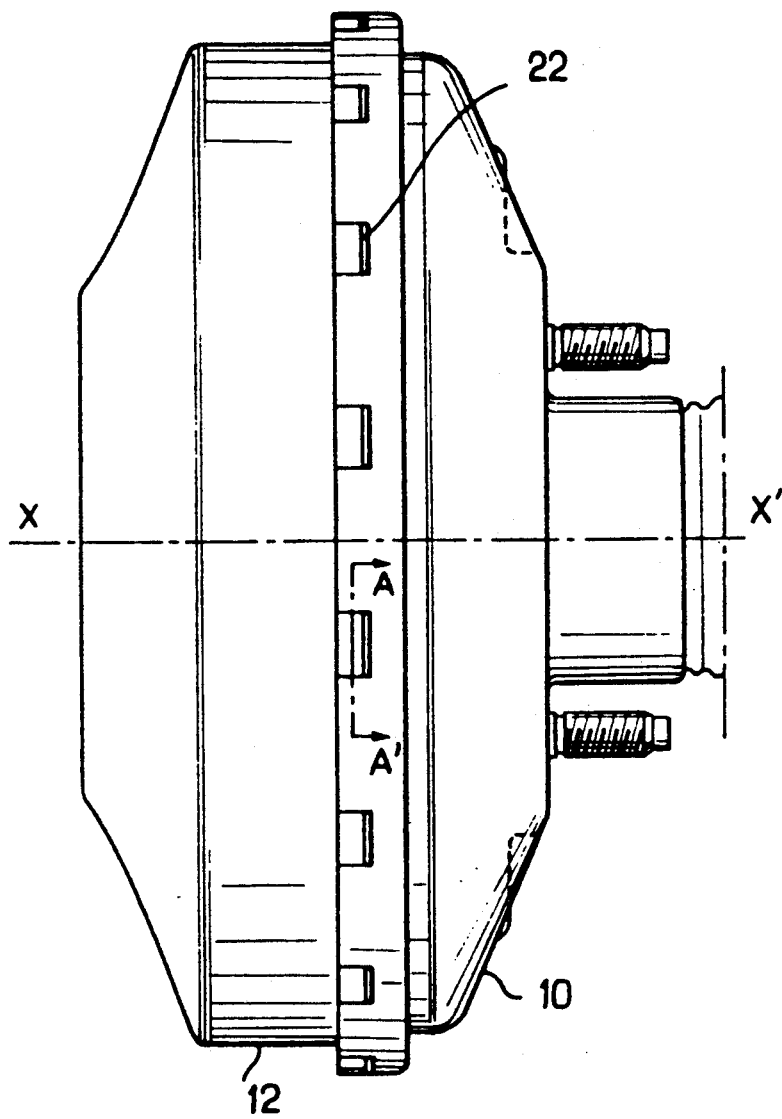
FIG. 1 is a profile view of a servomotor assembled according to the invention.

Looking at the figures, the servomotor comprises a sheet-metal cover 10 crimped at its periphery onto a sheet-metal cylinder 12. The cylinder 12 and the cover 10 have a symmetry of revolution about the axis XX' illustrated in FIG. 1. In general terms, the servomotor illustrated in FIG. 1 is of the type described in U.S. Pat. No. 4,571,942, to which reference can be made as regards the structure of the various component elements and the functioning of the servomotor. Such a servomotor is used for boosting the braking of motor vehicles.

Before the servomotor is assembled, a radial shoulder 14 followed by a cylindrical projection 16 adjacent the free edge of the cover 10 are formed on the border of the cover 10 by stamping.

Figure 3:
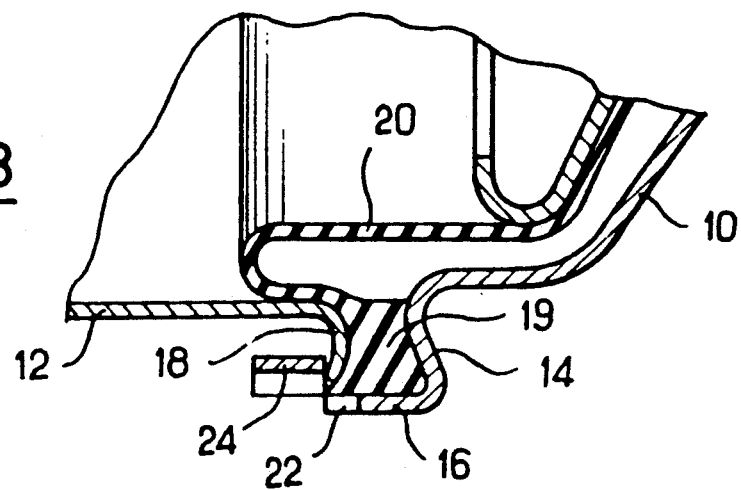
FIG. 3 is a partial enlarged view of a diametral section through the servomotor of FIG. 1, and FIGS. 4 and 5 are views of punches utilized to effect the stamping process.
Figure 1:
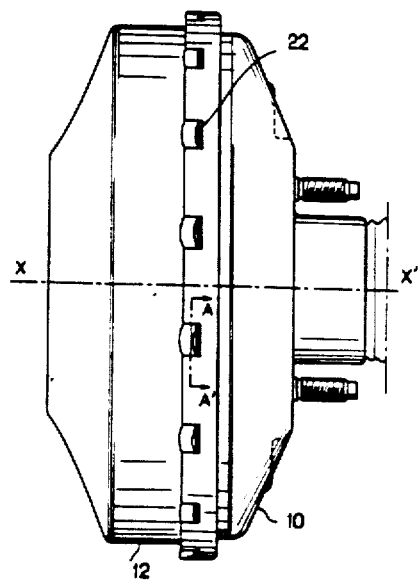
Figure 2:
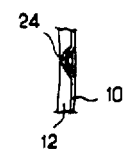
Figure 3:
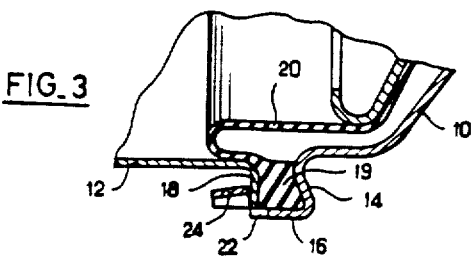

In a similar way, a radial rim 18 is formed on the periphery of the cylinder 12 by stamping. As illustrated in FIG. 3, the shoulder 14, the rim 18, and the cylindrical projection 16 produce, after the servomotor as been assembled, an annular recess, in which the outer bead 19 of the diaphragm 20 of the piston (not shown) of the servomotor is retained in the conventional way in order to form a gasket. This diaphragm is made of elastomeric material.

Oblong slots 22 are made by cutting on the cylindrical projection 16 according to a uniform angular distribution, as illustrated in FIG. 1. As a non-limiting example, the slots are substantially rectangular, 3 millimeters wide by 15 millimeters long. These slots thus define, with the free edge of the cylindrical projection, zones of less resistance 24 and boundaries 25 which will be deformed during the final crimping of the cover onto the cylinder, after the mounting of the various internal components of the servomotor, particularly the positioning of the bead 19, as illustrated in FIG. 3.

After cutting out the slots 22, but before final crimping, a protective coating (such as a varnish or paint) is arranged on the pieces as a whole and particularly on the edge of the sheet metal thus cut out, in order to improve the corrosion resistance. The width provided for the slots is sufficient to allow good penetration of the coating into the slots.

Preferably, this width will be such that a visual check of the diaphragm can easily be carried out after crimping.

According to the invention, for assembly, the cover 10 is first pressed against the cylinder 12 so as to crush the bead 19 of the diaphragm 20 between the shoulder 14 and the rim 18. The zones of less resistance 24 located between the boundary of each slot 22 and the free edge of the cylindrical projection 16 are then stamped, in such a way that the middle part of the stamped boundary moves away from the rim 18 and a plane y parallel to the rim and passing through the ends of the slot 22, the ends of the slot remaining near the rim 18. Finally, the pressure exerted under the two pieces is released.

Consequently, the middle part of the boundary is not in contact with the rim 18 and no longer constitutes a source of corrosion.

For this purpose, of course, the stamping step must be carried out in a special way. It is possible, for example, to use a punch 30 shown in FIG. 4, of which the cross-section in the plane containing the axis of the working surface and the thrust force assumes the general form of a rectangular trapezium, the side facing the part to be stamped being bevelled in such a way that the working surface 31 of the punch first comes in contact with the zone of less resistance 24 to be stamped in the region of the boundary 25 of the slot 22 and comes in contact with the opposite part 26 only after the partial stamping of the zone of less resistance 24. The working surface 31 has an axis (see dashed line) that is perpendicular to the longitudinal axis A of the slot 22. In this case, the force exerted on the punch remains perpendicular to the zone of less resistance 24 to be stamped.

Figure 5:
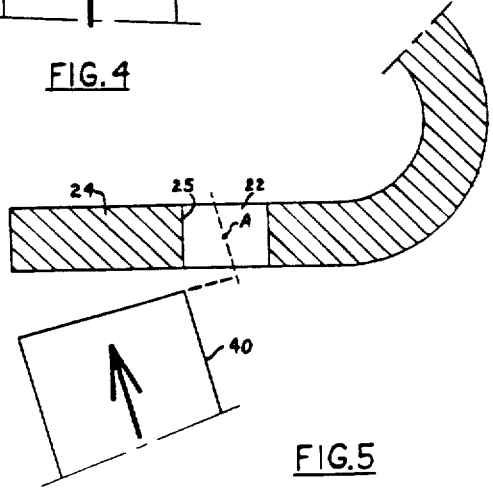

Alternatively, as shown in FIG. 5, the cross-section described above can be of rectangular form, the force exerted on the punch 40 then being oblique relative to the zone of less resistance 24 to be stamped.

Although the invention has been described with reference to a vacuum-type servobrake for boosting the braking of motor vehicles, it is clear that it can also apply to the assembly of any other unit of cylindrical form or not. In practice, it is used for assembling all metal pieces which are to be protected against corrosion.

I claim:

1. A process for the assembly, by crimping, of a metal cylinder and a metal cover, said cylinder having a radial rim extending radially outwardly and the cover having a border of which a radial shoulder is substantially parallel to the radial rim and a horizontally extending cylindrical projection, in which a plurality of uniformly distributed oblong slots has been made, has boundaries of the slots near a free edge of the cylindrical projection substantially perpendicular to the radial rim which the boundaries oppose, said cylinder being fitted into the cover after a deformable gasket has been arranged therebetween and other components of the assembly have been enclosed, the cylinder and the cover having previously been covered with a protective coating, the process comprising the steps of:

pressing the cover and the cylinder against one another so as to crush the gasket, stamping zones of less resistance located between said boundaries and free edge in such a way that a middle part of each stamped boundary moves away from a plane parallel to the radial rim and passing through ends of an associated boundary, and releasing the pressure tending to crush the gasket.

2. The process according to claim 1, characterized in that the stamping is carried out by means of a punch having a working surface which has an axis perpendicular to a plane of an axis of a respective slot and not parallel to said zone to be stamped, a force being exerted on the punch perpendicularly to the zone to be stamped.

3. The process according to claim 1, characterized in that the stamping is carried out by means of a punch having a working surface which has an axis perpendicular to a plane of a longitudinal axis of a respective slot and perpendicular to an axis along which a force is exerted, the axis along which the force is exerted forming an acute angle relative to an axis perpendicular to the zone to be stamped.

4. The process according to claim 1, characterized in that a width of the slots is such that the width allows a visual check of the gasket.

5. The process according to claim 4, characterized in that each slot assumes an substantially rectangular form.

* * * * *

UNITED STATES PATENT AND TRADEMARK OFFICE
CERTIFICATE OF CORRECTION

PATENT NO. : 5,074,024
DATED : December 24, 1991
INVENTOR(S) : Jean-Pierre Gautier Page 1 of 4

It is certified that error appears in the above-indentified patent and that said Letters Patent is hereby corrected as shown below:

The title page, showing illustrative figures, should be deleted and substitute therefor the attached title page.

Figure 2:
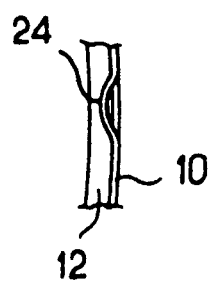
FIG. 2 is a partial sectional view along the line A—A of the servomotor of FIG. 1.

Delete Drawing Sheet 1 and substitute therefor the Drawing Sheet consisting of FIGS. 1-3 as shown on the attached page.

Figure 4:
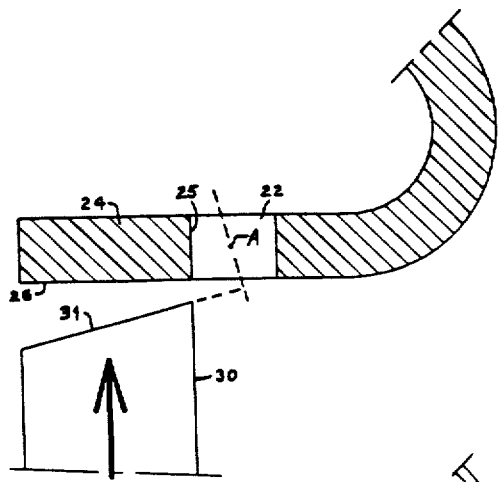

Add the Drawing Sheet consisting of FIGS. 4-5 as shown on the attached page.

Signed and Sealed this

Nineteenth Day of July, 1994

Attest:

BRUCE LEHMAN

*Attesting Officer*  *Commissioner of Patents and Trademarks*

United States Patent

Gautier

Patent Number: 5,074,024
Date of Patent: Dec. 24, 1991

[54] PROCESS FOR ASSEMBLING A SERVOMOTOR

[75] Inventor: Jean-Pierre Gautier, Aulnay S/Bois, France

[73] Assignee: Bendix France, Drancy, France

[21] Appl. No.: 223,828

[22] Filed: Jul. 14, 1988

[30] Foreign Application Priority Data

Jul. 21, 1987 [FR] France ................ 87 10277

[51] Int. Cl.⁵ ............................................. B23P 19/04
[52] U.S. Cl. .................................... 29/451; 29/513
[58] Field of Search .............. 29/510, 511, 513, 432, 29/437, 450, 451

[56] References Cited

U.S. PATENT DOCUMENTS

| | | | |
|---|---|---|---|
| 3,158,930 | 12/1964 | Wesstrom et al. | 29/510 |
| 4,136,438 | 1/1979 | Mallors | 29/510 X |
| 4,268,945 | 5/1981 | Van Arman et al. | 29/156.4 R X |
| 4,366,612 | 1/1983 | Dorsett et al. | 29/510 X |

Primary Examiner—Timothy V. Eley
Assistant Examiner—Peter Dungba Vo
Attorney, Agent, or Firm—Larry J. Palguta; Ken C. Decker

[57] ABSTRACT

The invention relates to a process for the assembly, by crimping, of a cover (10) to a cylinder (12), in which the cylinder (12) has a rim (18) extending outwardly and the cover (10) has a border of which radial shoulder (14) is substantially parallel to the rim (18) and a cylindrical projection (16), in which a plurality of uniformly distributed oblong slots (22) has been made, is perpendicular to the rim which it surrounds. The cylinder (12) is fitted into the cover (10) after a deformable gasket (19) has been arranged between them and other components of the finished assembly have been enclosed, the cover (10) and cylinder (12) having previously been covered with a protective coating. According to the invention, the process involves the steps of the cover (10) and cylinder (12) being pressed against one another so as to crush the gasket (19), with zones of less resistance (24) being located between boundaries (25) of the slots (22) and a free edge of the cover (10) being stamped in such a way that the middle parts of the stamped boundaries (25) move away from a plane (Y) parallel to the rim (18) and passing through the ends of the slots (22), and pressure tending to crush the gasket (19) being released. The invention is used for the manufacture of brake boosters for vehicles.

5 Claims, 1 Drawing Sheet

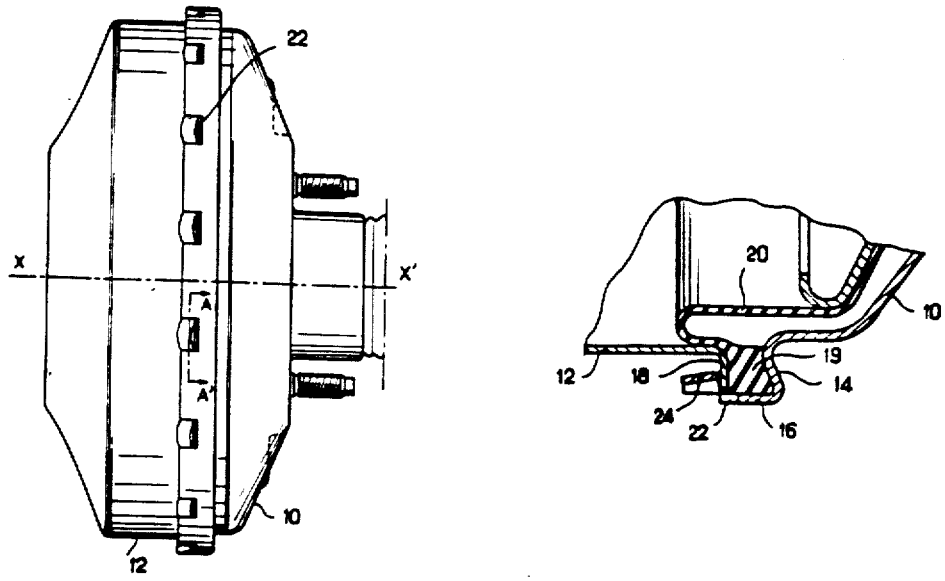

2/2